UNITED STATES PATENT OFFICE 2,670,388

PREPARATION OF UNSATURATED FLUOROCHLOROCARBON

Charles B. Miller, Lynbrook, N. Y., and John D. Calfee, Dayton, Ohio, assignors to Allied Chemical & Dye Corporation, New York, N. Y., a corporation of New York No Drawing. Application August 3, 1951, Serial No. 240,286

2 Claims. (Cl. 260—653)

This invention relates to the preparation of chlorofluoro derivatives of aliphatic hydrocarbons, particularly to the preparation of $CCl_2=CClF$, a material useful as a chemical intermediate.

According to prior art procedures for the preparation of $CCl_2=CClF$, it has been the practice to treat $CCl_3CCl_2F$ with zinc in the presence of methyl alcohol according to the following reaction:

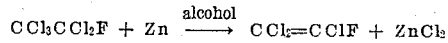

$$CCl_3CCl_2F + Zn \xrightarrow{\text{alcohol}} CCl_2=CClF + ZnCl_2$$

This process requires the preparation of the expensive intermediate $CCl_3CCl_2F$ and likewise necessitates the consumption of considerable quantities of the costly reagents zinc and alcohol.

An object of the present invention is to prepare $CCl_2=CClF$ by a simple, easily controlled, inexpensive process giving good yield of sought-for material.

We have now discovered that when $CCl_2=CCl_2$, a readily available and inexpensive raw material, is treated i. e., fluorinated, in the gas phase with gaseous HF in the presence of aluminum fluoride catalyst at certain temperatures, a chlorine atom of the $CCl_2=CCl_2$ is replaced by fluorine resulting in the formation of $CCl_2=CClF$. Aluminum fluoride catalyst has the property of promoting the fluorination of $CCl_2=CCl_2$ to form $CCl_2=CClF$ under readily maintained operating conditions to such an extent that when $CCl_2=CCl_2$ is contacted in the presence of HF with suitable aluminum fluoride catalyst, fluorination to $CCl_2=CClF$ takes place with good yields (percentage of the sought-for material recovered based on the amount of such material theoretically obtainable from the $CCl_2=CCl_2$ converted) and conversions (amount of $CCl_2=CCl_2$ which undergoes reaction) to desired products as compared with previously proposed procedures.

A variety of types of aluminum fluoride is known in the art. Such materials consist of lumps or smaller discrete particles, which lumps or particles in turn are composed of $AlF_3$ crystals of relatively large size, i. e. not less than about 1000 and usually several thousand Angstrom units radius and above, as in the case of commercial types of aluminum fluoride available on the market. According to the preferred form of our invention, substantially anhydrous aluminum fluoride composed of crystals of about 1000 Å. radius and above and which promote the fluorination of $CCl_2=CCl_2$ are employed. Anhydrous aluminum fluorides which contain at least about 95% $AlF_3$, preferably at least about 98% $AlF_3$, ordinarily possess the desired catalytic activity. Raw commercial aluminum fluorides may contain certain amounts of water, e. g. water of hydration. In order to produce the anhydrous aluminum fluoride catalyst desired for the purpose of the present invention, such water is removed by heating under conditions to completely dry the aluminum fluoride while preventing hydrolysis thereof, e. g. heating at about 450° C. until the bulk of the water is removed and thereafter further heating at above about 600° C. until residual amounts of water have been removed.

Certain forms of aluminum fluoride when examined even under the highest powered microscope, appear to be of non-crystalline or "amorphous" structure. When such "amorphous" aluminum fluorides are examined using X-ray diffraction technique, extremely small sub-microscopic crystals, i. e. "crystallites," which have crystal size of below about 1000 Å. radius may be detected. According to an alternative embodiment of our invention, such "amorphous" and substantially anhydrous aluminum fluorides having crystals below about 1000 Å. radius are used in the fluorination of $CCl_2=CCl_2$ to $CCl_2=CClF$. Within this embodiment of the invention particular aluminum fluoride catalysts are those composed of crystallites having radius below about 500 Å., preferably below about 200 Å., since, as will appear below, lower operating temperatures are afforded by use thereof. One example of procedure for preparing such aluminum fluorides having crystallite size below about 1000 Å. is as follows:

139 parts of granular (6 to 20 mesh) anhydrous aluminum chloride of commercial grade were charged to a tubular nickel reactor, and gaseous anhydrous HF, diluted with nitrogen was passed through the tube for 5 hours while maintaining internal tube temperature not above about 85° C. During the latter 5 hour treatment, as reaction intensity gradually decreased, the percentage of nitrogen in the gas stream was also decreased. The temperature of the reactor was thereupon slowly raised to 300° C. while continuing passage of a slow HF stream (in the absence of nitrogen) through the tube for an additional period of 2 hours. At this point, the reactor effluent gas contained only HF and was substantially free of HCl. 88 parts of aluminum fluoride containing 98% $AlF_3$ and less than 0.15% chlorine, in hard granular form and having substantially the same mesh size as the aluminum chloride, were recovered. An X-ray diffraction pattern of material prepared according to the method outlined above was made, which indicated crystallite size to be less than 200 Å radius, i. e. the crystallite size was so small as to be indicative of "amorphous" structure.

If desired, in fluorinating CCl₂=CCl₂ the catalyst may be used in the form of a fluidized solid bed or suspended on a non-siliceous inert carrier such as activated alumina, activated carbon, metal fluorides or nickel.

While the mechanism of the reaction of this invention is not entirely clear, the over-all effect appears to be that the fluorine of the HF replaces the chlorine of the CCl₂=CCl₂ according to the following reaction:

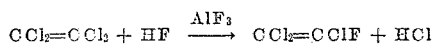

$$CCl_2=CCl_2 + HF \xrightarrow{AlF_3} CCl_2=CClF + HCl$$

Reaction zone temperatures are maintained at or above the level at which all materials introduced into the reaction are completely in the gas phase and also at or above the level at which fluorination of CCl₂=CCl₂ in the presence of HF begins to take place. The broad range of temperatures suitable for producing fluorination of CCl₂=CCl₂ is approximately 500–750° C. When either the crystalline AlF₃ (greater than about 1000 Å. radius) or the non-crystalline AlF₃ (smaller than 1000 Å. radius) is employed, no particular advantage accrues when temperatures are maintained above about 750° C. and temperatures above this level are ordinarily avoided to prevent possible decomposition of reactants and/or products and to avoid other possible inherent economic disadvantages. When the preferred crystalline form of catalyst is used (containing crystallites of about 1000 Å. radius and above), fluorination begins to occur at an appreciable rate at temperature of about 600° C. and hence temperatures in the approximate range of 600–750° C., preferably 650–700° C. are maintained when utilizing crystalline aluminum fluoride.

If lower fluorination temperatures are desired, non-crystalline aluminum fluoride catalyst is utilized since it has been found that such catalyst promotes desired fluorination at temperatures as low as 500° C. Hence, temperatures in the approximate range of 500–600° C. are feasible when utilizing the latter type of catalyst. Aluminum fluorides composed of crystallites of size below about 500 Å. radius, preferably below about 200 Å. radius, are more adept at promoting fluorination within the 500–600° C. range than are catalysts having larger crystallites. However, elevated temperatures tend to promote crystallite to crystal growth and thereby cause transformation of non-crystalline aluminum fluoride into crystalline aluminum fluoride and hence, particularly when maintaining temperature approaching the 600° C. level, it may be found that the original non-crystalline fluoride is gradually converted into aluminum fluoride having larger crystallites and even into aluminum fluoride having crystals greater than about 1000 Å. radius, thereby requiring a gradual upward shift in fluorination temperature.

The time of contact of CCl₂=CCl₂ with the aluminum fluoride catalyst may be varied to some extent without noticeable sacrifice in yield and efficiency of operation. However, if contact time is excessive, i. e. very low space velocities, the capacity of the reactor is low, thereby causing economic disadvantages in the operation. On the other hand, if contact time is too short, i. e. at excessively high space velocities, the fluorination of CCl₂=CCl₂ to form the desired product may be incomplete, thereby entailing possible high cost of recovery and recycling unreacted material to subsequent operation. Accordingly, the time of contact employed is sufficient to effect reaction to the desired extent without unduly decreasing the reactor output. In a particular operation optimum rate of flow of CCl₂=CCl₂ through the reaction zone is dependent upon variables such as scale of operation, quantity of catalyst in the reactor and the specific operation employed, and may be best determined by a test run.

The molar ratio of HF to CCl₂=CCl₂ is maintained sufficiently high to supply the amount of fluorine required to bring about the desired fluorination of CCl₂=CCl₂ to form CCl₂=CClF. Fluorination to an appreciable extent may be noted at molar ratios of HF to CCl₂=CCl₂ as low as about ½:1 but ratios of about 1:1 or above should be used for more complete fluorination. Preferably ratios substantially in excess of 1:1 are employed, since mass action favors formation of desired product when excess quantities of HF are present. Maximum ratios are limited only by desired high reactor capacity, i. e. excessively high ratios tend to produce high gas velocities and consequent short time of contact between reactant and catalyst and incompleteness of fluorination, thereby necessitating lower space velocity and consequent lower reactor output.

For convenience, atmospheric pressure operation is preferred. The reaction may, if desired, be carried out at super-atmospheric or sub-atmospheric pressure, the choice being largely one of convenience, e. g. determined by the nature of prior treatment of the starting material or subsequent treatment of the reaction product.

Generally, the process of the invention is carried out by contacting the CCl₂=CCl₂ with an aluminum fluoride catalyst described above in the presence of gaseous HF at temperature at which the fluorination takes place. Operations may be suitably carried out by introducing the gaseous material comprising CCl₂=CCl₂ into a reaction zone containing aluminum fluoride having the properties set forth above and heating said material in the zone at temperatures heretofore indicated for a time sufficient to convert an appreciable amount of CCl₂=CCl₂ to CCl₂=CClF, withdrawing gaseous products from the zone and recovering said CCl₂=CClF from the gaseous products. Although not limited to continuous operations, the process of our invention may be advantageously carried out thereby. It is preferable to utilize pure CCl₂=CCl₂ as starting material and introduce such material in the gas phase mixed with HF into the reaction zone. However, this does not preclude introducing CCl₂=CCl₂ diluted with other gaseous material, e. g. an inert gas such as nitrogen, into the reaction zone. If such impure CCl₂=CCl₂ is available and it is desirable to carry out fluorination thereof to produce the above indicated products, this material may be introduced into the reaction zone, contacted with aluminum fluoride catalyst in the presence of gaseous HF and fluorination of the CCl₂=CCl₂ thereby brought about to produce CCl₂=CClF.

Various reaction products in the reaction zone exit gas stream may be recovered separately or in admixture in any suitable manner. Suitably, the gas discharged from the reactor is recovered by scrubbing with water to remove HCl and HF and high boiling material from the gas, then passing the gas over calcium chloride, soda lime or other drying agent to remove water and then through a condenser cooled to about minus 78° C. with solid carbon dioxide and acetone mixture to condense any extremely low boiling material present. The principal products condensed are $CCl_2=CClF$ (boiling point plus 71° C.) and $CCl_2=CCl_2$ (boiling point plus 121° C.), and in addition trace amounts of $CClF_3$ (boiling point minus 83°C.) and $CClF_2CF_3$ (boiling point minus 38°C.). Individual compounds may be recovered, e. g. by distillation, from condensates obtained above. Any unreacted $CCl_2=CCl_2$ may be recycled to subsequent operation.

Any suitable chamber or reactor tube constructed of inert material may be employed for carrying out the reaction provided the reaction zone afforded is of sufficient length and cross-sectional area to accommodate the required amount of aluminum fluoride necessary to provide adequate gas contact area, and at the same time afford sufficient free space for passage of the gas mixture at an economical rate of flow. Material such as nickel, graphite, inconel and other materials resistant to HF may be mentioned as suitable for use as reactor tube. Externally disposed reactor tube heating means such as electrical resistance heaters may be supplied.

The following examples illustrate the practice of our invention, parts and percentages being by weight:

*Example 1.*—100 parts of substantially anhydrous aluminum fluoride catalyst having crystallite size less than 500 Å. radius prepared by reacting anhydrous aluminum fluoride with gaseous anhydrous HF were arranged in a fixed bed supported on a nickel screen in a vertically mounted ¾" internal diameter, 3-foot long nickel tube. The tube was externally electrically heated and the tube ends were fitted with pipe connections for the inlet and outlet of a gas stream and for the insertion into the nickel tube and catalyst bed of a suitable thermocouple. A gaseous mixture of about 52 parts per hour of $CCl_2=CCl_2$, and HF in ratio of about 1 mol of the former to 3 mols of the latter, was introduced into the bottom of the nickel tube and passed upwardly through the bed of $AlF_3$. By suitably adjusting the electrical heaters thereby to control the rate of heat input into the gas stream, temperature of the catalyst bed was maintained at about 600° C. Gaseous products of the reaction were withdrawn overhead, cooled, thence passed successively through a water scrubber, a drier containing $CaCl_2$ as the drying agent and a condenser held at about minus 78° C. by means of an external cooling bath of carbon dioxide ice and acetone. Products were identified by boiling point and infra-red spectrogram. Fractions boiling at minus 75 to minus 80° C. ($CClF_3$), minus 45° C. ($CF_3CCl_2F$), a principal fraction boiling at plus 72° C., identified as $CCl_2=CClF$, and unreacted HF and $CCl_2=CCl_2$ were obtained. Conversion of HF to fluorinated products was 36% and about 50% of the $CCl_2=CCl_2$ charged was converted to $CCl_2=CClF$.

*Example 2.*—A gaseous mixture of about 67 parts per hour of $CCl_2=CCl_2$, and HF in ratio of about one mol of the former to about 3.5 mols of the latter was passed through the nickel tube and catalyst bed employed in Example 1, while maintaining catalyst bed temperature at 750° C. Gaseous products were withdrawn from the tube and treated and recovered as in Example 1. The foregoing operating conditions were maintained for 3½ hours, after which time the aluminum fluoride catalyst had become substantially completely crystalline (crystal size greater than about 1000 Å. radius). In the succeeding 2 hours, during which time 135 parts of $CCl_2=CCl_2$ were passed through the tube, 15 parts of $CCl_2=CClF$ were formed and subsequently recovered. Conversion of HF to fluorinated products was 40%.

We claim:
1. The process for fluorinating $CCl_2=CCl_2$ which comprises contacting said $CCl_2=CCl_2$ in the presence of sufficient gaseous HF to form $CCl_2=CClF$ and at fluorination temperature in the approximate range 500–750° C. with aluminum fluoride catalyst, for time sufficient to fluorinate an appreciable amount of said $CCl_2=CCl_2$ to form $CCl_2=CClF$.

2. The process for fluorinating $CCl_2=CCl_2$ to $CCl_2=CClF$ which comprises introducing a gaseous material comprising $CCl_2=CCl_2$ and at least an equimolecular amount of gaseous HF mixed therewith into a reaction zone containing aluminum fluoride catalyst having crystal size at least as great as about 1000 Angstrom units radius, heating said material in said zone at temperature in the approximate range 650–700° C. for time sufficient to fluorinate an appreciable amount of said $CCl_2=CCl_2$ to form gaseous product comprising $CCl_2=CClF$, withdrawing gaseous product from said zone, and recovering said $CCl_2=CClF$ from said gaseous product.

CHARLES B. MILLER.
JOHN D. CALFEE.

References Cited in the file of this patent

UNITED STATES PATENTS

| Number | Name | Date |
| --- | --- | --- |
| 1,996,115 | Lazier | Apr. 2, 1935 |
| 2,466,189 | Waalkes | Apr. 5, 1949 |
| 2,471,525 | Hillyer et al. | May 31, 1949 |